(12) United States Patent
Ferrazzano

(10) Patent No.: US 12,397,646 B2
(45) Date of Patent: Aug. 26, 2025

(54) DISPLAY DEVICE FOR DASHBOARD OF A ROAD VEHICLE AND RELATIVE ROAD VEHICLE

(71) Applicant: FERRARI S.p.A., Modena (IT)

(72) Inventor: Antonio Ferrazzano, Modena (IT)

(73) Assignee: FERRARI S.p.A., Modena (IT)

( * ) Notice: Subject to any disclaimer, the term of this patent is extended or adjusted under 35 U.S.C. 154(b) by 339 days.

(21) Appl. No.: 18/053,893

(22) Filed: Nov. 9, 2022

(65) Prior Publication Data

US 2023/0150365 A1    May 18, 2023

(30) Foreign Application Priority Data

Nov. 18, 2021 (IT) .................. 102021000029162

(51) Int. Cl.
  *B60K 37/00*   (2024.01)
  *B60K 35/22*   (2024.01)
  *G02F 1/1333*  (2006.01)

(52) U.S. Cl.
  CPC ........ *B60K 37/00* (2013.01); *G02F 1/133314* (2021.01); *B60K 35/22* (2024.01); *B60K 2360/84* (2024.01)

(58) Field of Classification Search
  CPC ........ B60K 37/20; B60K 35/50; B60K 35/60; B60K 37/00; B60K 35/213; B60K 35/215; B60K 2360/84; G02F 1/13314; G02F 1/13336; G02F 1/133314
  See application file for complete search history.

(56) References Cited

U.S. PATENT DOCUMENTS

| | | | |
|---|---|---|---|
| 2018/0079306 A1* | 3/2018 | Kim ................. | B60K 35/20 |
| 2024/0138238 A1* | 4/2024 | Kim ................. | H10K 59/8792 |
| 2024/0246416 A1* | 7/2024 | Jungmann .......... | B60K 35/50 |

FOREIGN PATENT DOCUMENTS

| | | |
|---|---|---|
| DE | 102015113045 A1 | 2/2017 |
| DE | 112014003496 B4 | 8/2021 |
| EP | 3656598 A1 | 5/2020 |
| FR | 3010666 A1 | 3/2015 |
| JP | 2013142695 A | 7/2013 |
| JP | 2018031898 A * | 3/2018 |
| WO | 2019103991 A1 | 5/2019 |

OTHER PUBLICATIONS

Machine translation of FR-3010666-A1 to Laine et al.; published Mar. 20, 2015. (Year: 2015).*
Italian Search Report for Application No. 102021000029162 completed Jun. 8, 2022.
Office Action in European Patent Application No. 22207718.2, Date of Mailing Jan. 9, 2024, 6 pages.

* cited by examiner

*Primary Examiner* — Daniel J Colilla
(74) *Attorney, Agent, or Firm* — CANTOR COLBURN LLP

(57) ABSTRACT

A display device for a dashboard of a road vehicle comprising: a support element, which is at least partially curved and comprises, in turn, a lower portion and an upper portion; at least one screen mechanically connected to the support element and configured so as to be visible to the driver while driving; wherein the screen follows the curvature of the support element so that the concave portion is arranged towards the driver.

12 Claims, 5 Drawing Sheets

DISPLAY DEVICE FOR DASHBOARD OF A ROAD VEHICLE AND RELATIVE ROAD VEHICLE

CROSS-REFERENCE TO RELATED APPLICATIONS

This patent application claims priority from Italian patent application no. 102021000029162 filed on Nov. 18, 2021, the entire disclosure of which is incorporated herein by reference.

TECHNICAL SECTOR

The invention relates to a display device for a dashboard of a road vehicle and to a relative road vehicle.

BACKGROUND ART

Generally speaking, road vehicles are provided with a plurality of display devices arranged in the area of the dashboard of the road vehicle.

From a historical point of view, each road vehicle used to comprise at least one analogue display device (for example a speedometer, a revolution-counter, a fuel indicator, warning lights and/or suitable pointers) to transmit information on the conditions of the vehicle to the driver. For example, these devices used to be arranged in the area of the control panel of the vehicle, namely on the dashboard portion interposed between the steering wheel and the windshield.

In recent years, in an attempt to make the display of information more flexible, easy to update and capable of being customized, these devices have evolved to a digital form, for example by replacing the plurality of analogue devices present in the control panel with one single screen, always arranged between the steering wheel and the windshield or arranged in different positions, such as at the centre of the dashboard of the road vehicle.

These solution, however, are not optimized for vehicle use, since they mainly consist of replacing the control panel with a flat, rectangular screen. This conformation, in order to allow the driver to maximize the display of information through the upper opening (with the shape of a half moon) of the steering wheel rim, requires a screen with much larger dimensions compared to the active area that is actually visible to the driver, thus determining the presence of unused screen areas, which (especially in a high-performance sports car) lead to an unjustified increase in weight and dimensions.

Furthermore, these devices require a continuous focussing by the eyes of the driver, who has to look at the screen from side to side.

DESCRIPTION OF THE INVENTION

The object of the invention is to provide a display device for a dashboard of a road vehicle and a relative road vehicle, which are at least partially free from the drawbacks described above and, at the same time, are simple and economic to be manufactured.

According to the invention there are provided a display device for a dashboard of a road vehicle and a relative road vehicle according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
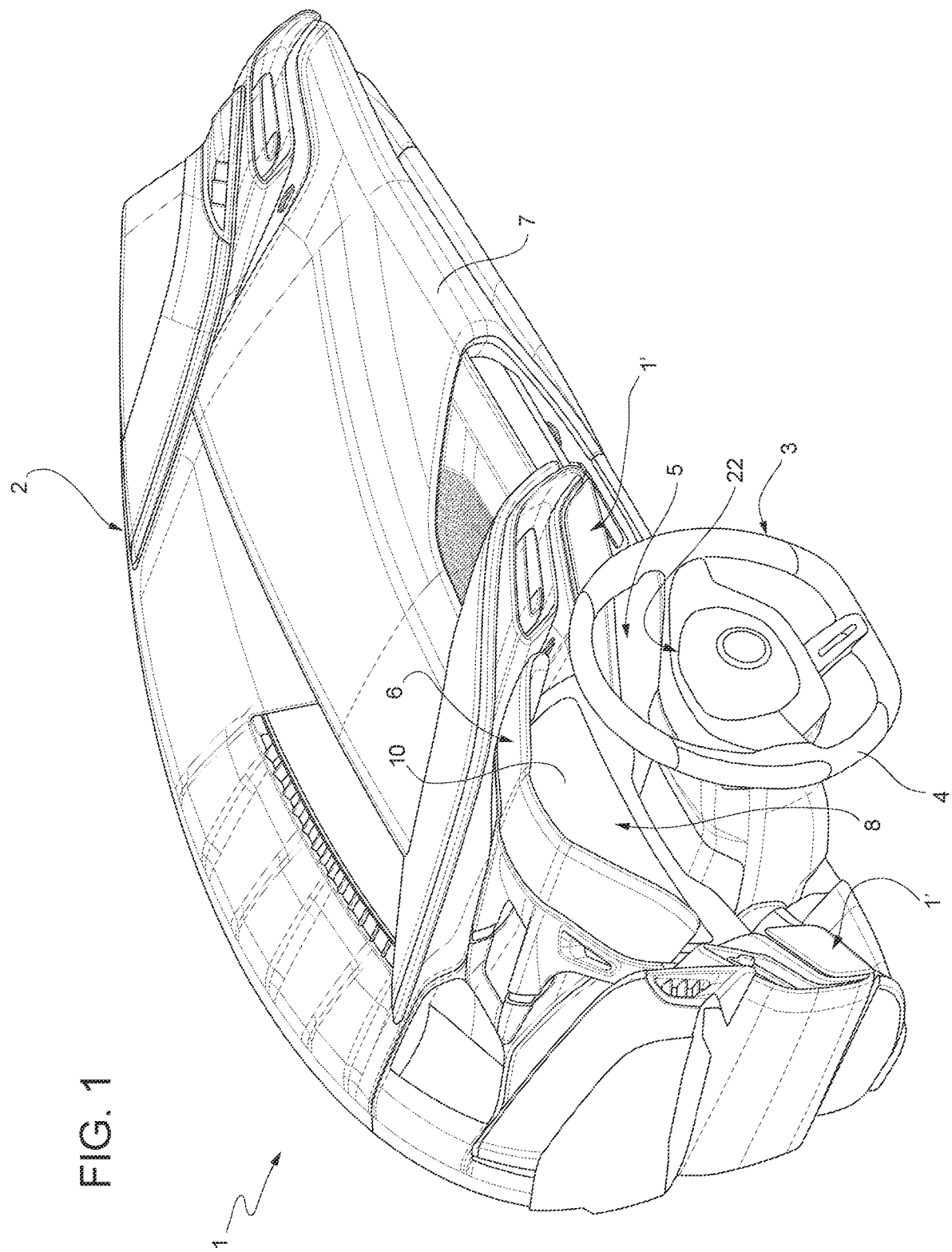
FIG. 1 is a schematic perspective view, with details left out for greater clarity, of an inner portion of a road vehicle according to the invention.

In FIG. 1, number 1 indicates, as a whole, a road vehicle driven by a driver DR (schematically shown in FIG. 2) and provided with two front wheels and with two rear wheels (in particular, drive wheels). The vehicle 1 is provided with a passenger compartment 2, which is designed to accommodate the driver DR and possible passengers.

Figure 2:
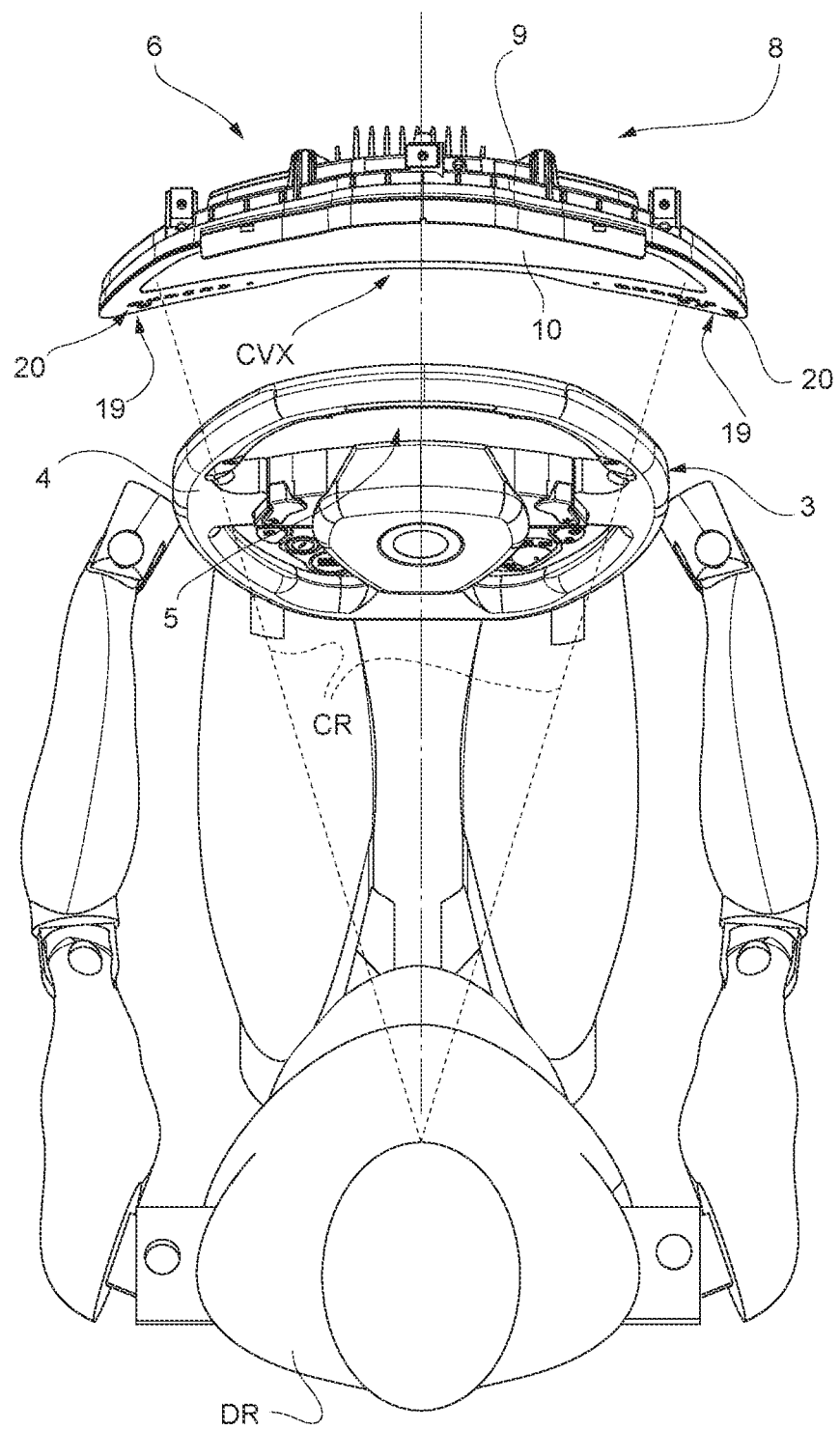
FIG. 2 is a schematic plan view, with details left out for greater clarity, of the inner portion of FIG. 1, in which a driver is sitting on a driver's seat and looks at a device according to the invention.

As shown in the non-limiting embodiments of FIGS. 1 and 2, the vehicle 1 comprises a steering wheel 3, which is provided with a steering wheel rim 4 comprising, in turn, at least one through opening 5. In particular, the through opening 5 is an opening that, when the steering wheels are straight (namely, arranged so as to run on a straight road), allows the driver DR to see, through it, a control panel 6.

In particular, the vehicle 1 further comprises a dashboard 7, which is arranged at the front of the passenger compartment 2 and preferably includes, within its volume, the control panel 6.

The vehicle 1 advantageously comprises a display device 8 configured to be arranged in the area of the dashboard 7.

Figure 3:
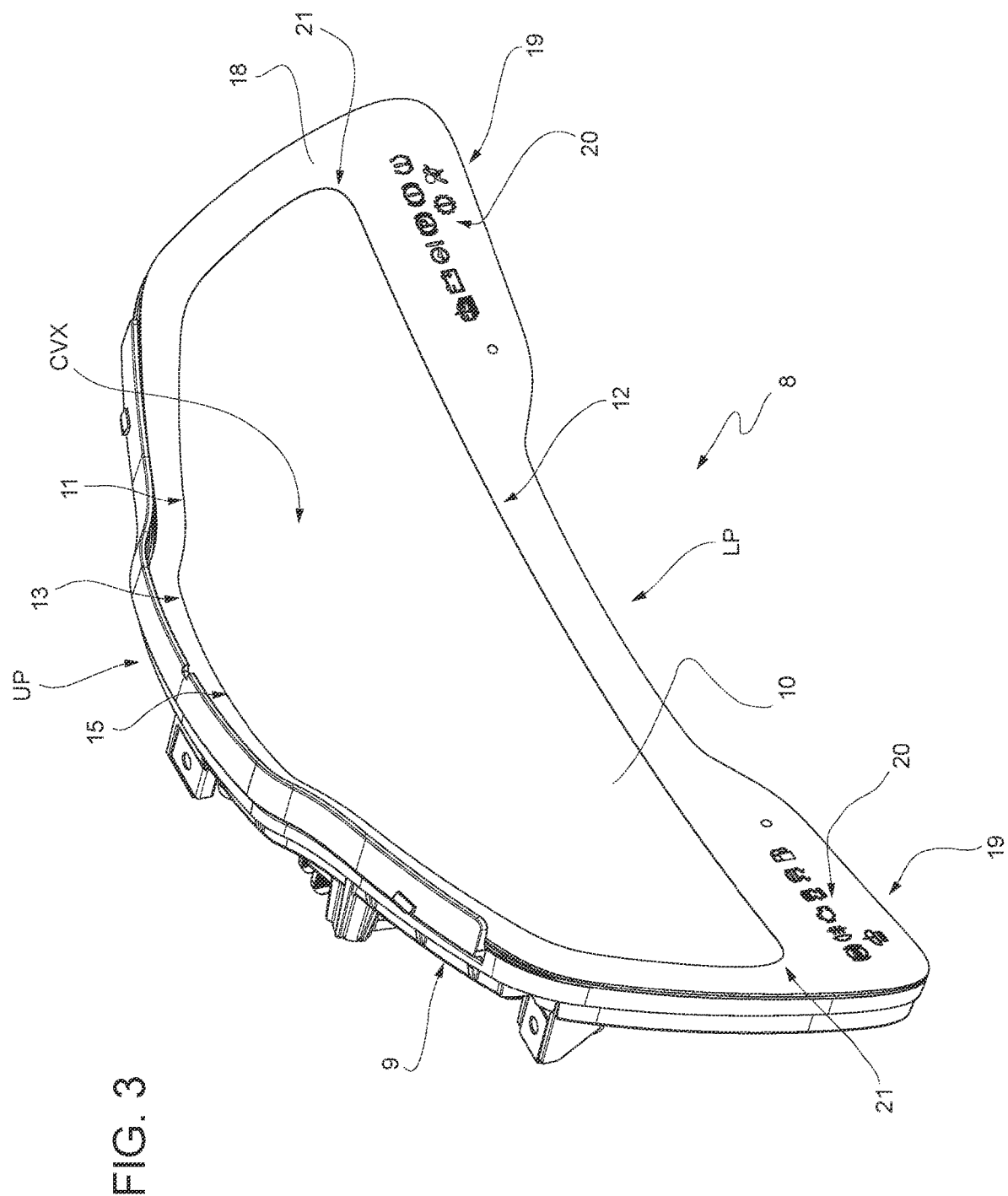
FIG. 3 is a schematic perspective view of a non-limiting embodiment of a display device according to the invention.
Figure 4:
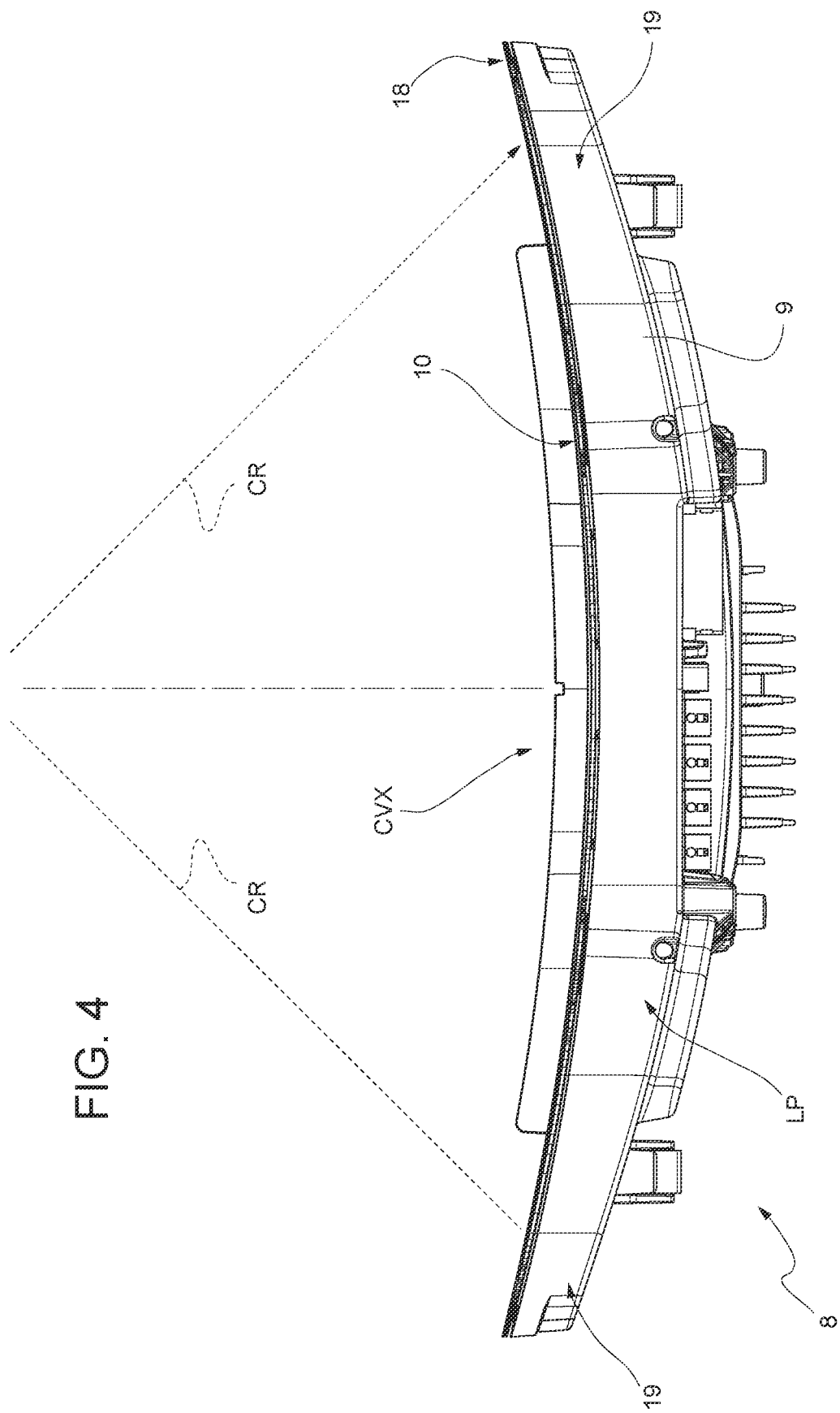
FIG. 4 is a schematic view from the bottom of the device of FIG. 3.
Figure 5:
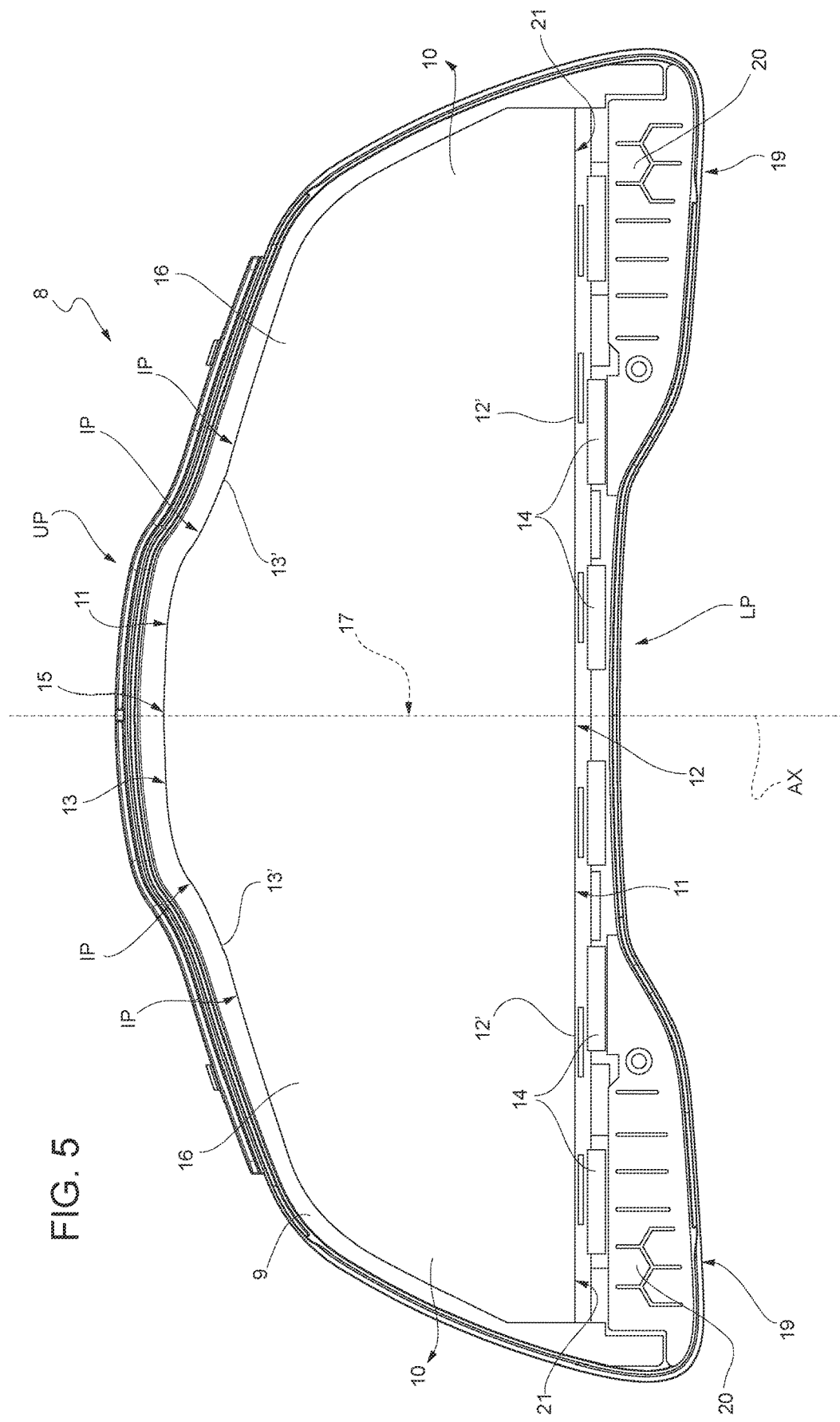
FIG. 5 is a schematic front view of the device of FIGS. 3 and 4, where at least one screen is visible.

According to the non-limiting embodiments of FIGS. 2 to 5, the display device 8 comprises an at least partially curved support element 9, which comprises, in turn, a lower portion LP and an upper portion UP (FIGS. 3 and 5).

The display device 8 preferably comprises at least one screen 10, which is mechanically connected to the support element 9 and is configured so as to be visible to the driver DR while driving (in particular, through the opening 5 of the steering wheel rim 4).

As shown in the non-limiting embodiment of FIG. 2, the screen 10 follows the curvature of the support element 9, in particular so that its concave portion CVX is arranged towards the driver DR.

In some non-limiting cases, like the ones shown in FIGS. 1 and 2, the device 8 is configured, namely arranged on board the vehicle 1, so as to be entirely visible through the through opening 5.

In other non-limiting cases, shown for example in FIG. 1, the vehicle 1 comprises at least one further device 1' (in particular, at least two) arranged so as to be visible while driving, though in areas other than the control panel 6. In the non-limiting embodiment of FIG. 1, said devices 1' are arranged on the right and on the left, respectively, of the steering wheel 3.

In some preferred non-limiting cases, like the one shown in FIG. 5, the screen 10 peripherally comprises a profile 11 having at least one straight portion 12 and one curvilinear portion 13. In particular, the screen 10 is delimited by the profile 11. In other words, the screen 10 is peripherally cut so as to follow the profile 11.

Advantageously, though not necessarily, as shown by the non-limiting embodiment of FIG. 5, the portion 12 is arranged in the area of the lower portion LP of the support element 9, whereas the curvilinear portion 13 is arranged in the area of the upper portion UP. In detail, the peripheral profile 11 determines a substantially bow-like shape, in which the straight portion 12 defines the string of the bow. By so doing, the installation of the screen 10 on the support element 9 is simplified. Furthermore, in this way, the straight portion can be used to arrange one or more connectors 14 which the screen 10 needs to operate (which are known per se and, therefore, will not described in detail below).

With reference to the non-limiting embodiment of FIG. 5, again, the profile 11, along the curvilinear portion 13, comprises at least two, preferably at least four inflection points IP (namely, points in which there is a change in the curvature sign). In particular, by so doing, the structure of the screen 10 is stiffened, thus facilitating production, assembly and transportation thereof.

Preferably, though not necessarily, the profile 11, along the curvilinear portion 13, comprises a bell-shaped protuberance 15 arranged at the centre. In this way, the view of the screen 10 is optimized, even in case the steering wheel 3, namely the steering wheel rim 4, is provided with symmetric upper paddings (which is often the case in state of the art steering wheels).

Advantageously, though not necessarily and according to the non-limiting embodiment of FIG. 5, the screen 10 comprises at least two sub-screens 16, which are configured to project a joint image. In particular, the joint image. In particular, the two sub-screens 16 are joined along a (straight) line 17 arranged on an symmetry axis AX of the screen 10. In this way, the installation on the support element 9 is further simplified, allowing for two straight sides (part of the straight portion 12 and the line 17) for a safer handling and for a possible side-by-side installation.

According to the non-limiting embodiment of FIG. 5, each one of the two sub-screens 16 comprises a respective curved sub-portion 12' and a respective straight sub-portion 13'; wherein each respective curved sub-portion 13' comprises at least one, in particular two inflection points IP.

Preferably, and as clearly shown by the non-limiting embodiments of FIGS. 3 and 5 (FIG. 3 showing the device 7 provided with a covering layer 18, for example a glass), the support element 9 (and the cover 18) comprises two septa 19 (or lobes), in particular symmetric septa, arranged in the area of the lower portion LP of the support element 9 and configured to comprise a vehicle warning light area 20 (the warning lights indicating, for example, problems of the engine, of the battery, of the tyres or vehicle conditions, such as the grip, the headlight configuration or the lack of fuel).

Advantageously, though not in a limiting manner, the vehicle warning light area 20 is divided into two portions, each in the area of a respective septum 19, in particular under the straight portion 12 of the screen 10.

Hence, the vehicle warning lights present in the area 20 are analogue lights, namely they are not part of the screen 10; in particular, the vehicle warning lights are arranged under it (and are obtained on the support element 9).

In particular, the septa 19 are arranged at the ends 21 of the straight portion 12 of the screen 10. In this way, the device 7 allows for a use of the entire viewing area enabled by the through opening 5, which is often also delimited by a central portion 22 of the steering wheel 3, which corresponds to the recess of the lower portion LP comprised between the two septa 19.

Advantageously, though not necessarily, the screen 10 has a curvature radius CR ranging from 700 to 850 mm. In particular, from 740 to 820 mm; more in particular, equal to 780 mm.

In some non-limiting cases, the curvature radius CR corresponds to the distance between the screen 10 and the eyes of the driver DR, so as to allow the driver DR to simultaneously bring into focus the entire screen 10. In other words, the convexity of the screen 10 allows the user's eyes to have a precise focus on the entire displaying surface (namely, on the screen 10) in the same instant, without having to readjust the focus while moving on the screen 10.

In other non-limiting cases, the curvature radius CR is smaller than the distance between the screen 10 and the driver's eyes. Thanks to this increased curvature, the information to be displayed to the driver DR on the screen 10 can be increased, since, for a same visual field, the dimension of the screen 10 (and, therefore, the relative number of pixels, given the same number of dpi) increases, thus allowing, for example, a greater number of icons, numbers, animations and/or items of information to be displayed compared to a smaller curvature.

Advantageously, the road vehicle 1 further comprises a control unit (of a known type and, hence, not shown herein and not described in detail), which is configured to control the division of the image between the two sub-screens 16, in particular depending on the current vehicle conditions. The control unit can physically consist of one single device or of several devices separate from one another and communicating with one another through the CAN network of the road vehicle 1.

Even though the invention described above relates to a specific embodiment example, it should not be considered as limited to said embodiment example, for its scope of protection also includes all those variants, changes or simplifications covered by the appended claims, such as, for instance, a different type of screen, a different arrangement of the connectors, a different type of vehicle (for example, a two-wheel vehicle or a front-drive vehicle), etc.

The invention offers many advantages.

First of all, it optimizes the view of the screen, thus reducing unused areas and, hence, reducing useless weights and space taken up within the dashboard of the road vehicle.

Furthermore, thanks to the invention, vehicle driving information, which cannot be transmitted to the driver, can be displayed more easily and/or in a more detailed or complete manner.

A further advantage of the invention lies in the possibility of facilitating the installation of the screen 10, improving at the same time its stiffness and ease of handling (even during the supplying or manufacturing thereof).

Finally, thanks to the invention, a plurality of curved screens can be installed in different points of the dashboard, thus improving the driving pleasure and the interaction between the driver and the vehicle.

LIST OF THE REFERENCE NUMBERS OF THE FIGURES 1 vehicle
1' display device
2 passenger compartment
3 steering wheel
4 steering wheel rim
5 through opening
6 control panel
7 dashboard 8 display device
9 support element
10 screen
11 profile
12 straight portion
13 curvilinear portion
12' straight sub-portion
13' curvilinear sub-portion
14 connectors
15 bell-shaped protuberance
16 sub-screens
17 joining line
18 cover
19 septa
20 warning light area
21 end
22 central portion of the steering wheel
AX symmetry axis
CR curvature radius
CVX concave portion
DR driver
IP inflection points
LP lower portion
UP upper portion

The invention claimed is:

1. A display device (8) for the dashboard (7) of a road vehicle (1); the display device (8) comprises:
   a support element (9) which is at least partially curved and comprises a lower portion (LP) and an upper portion (UP);
   at least one screen (10), mechanically connected to the support element (9) and configured to be visible to the driver while driving;
   wherein the screen (10) follows the curvature of the support element (9) so that a concave portion (CVX) is arranged towards the driver,
   wherein the screen (10) comprises perimetrically a profile (11) having at least one straight portion (12) and one curvilinear portion (13), and
   wherein the support element (9) comprises two septa (19) arranged at the lower portion (LP) of the support element (9) and configured to comprise an area (20) including vehicular warning lights.

2. The display device (8) according to claim 1 and configured to be entirely visible through an opening (5) of a steering wheel crown (4) of the road vehicle (1).

3. The display device (8) according to claim 1, wherein the straight portion (12) is arranged in correspondence to the lower portion (LP) of the support element (9), while the curvilinear portion (13) is disposed in correspondence to the upper portion (UP), the perimeter profile (11) determining a substantially arch shape in which the straight portion (12) defines a chord of the arch.

4. The display device (8) according to claim 3, wherein the profile (11), along the curvilinear portion (13), comprises at least two inflection points (IP).

5. The display device (8) according to claim 3, wherein the profile (11), along the curvilinear portion (13), comprises at least four inflection points (IP).

6. The display device (8) according to claim 3, wherein the profile (11), along the curvilinear portion (13), comprises a centrally arranged bell-shaped protuberance (15).

7. The display device (8) according to claim 1, wherein the screen (10) comprises at least two sub-screens (16), configured to project a joint image.

8. The display device (8) according to claim 7, wherein the two sub-screens (16) are joined along a line (17) arranged on an axis (AX) of symmetry of the screen (10).

9. The display device (8) according to claim 7, wherein each of the two sub-screens (16) comprises a respective curvilinear sub-portion (13') and a respective rectilinear sub-portion (12'); wherein each respective curvilinear sub-portion (12', 13') comprises at least two inflection points.

10. The display device (8) according to claim 1, wherein the septa (19) are arranged at the ends (21) of the straight portion (12) of the screen (10).

11. The display device (8) according to claim 1, wherein the screen (10) has a curvature radius (CR) from 700 to 850 mm.

12. A road vehicle (1) comprising:
   four wheels, of which at least one pair of driving wheels;
   a steering wheel (3), provided with a steering wheel rim (4) comprising at least one through opening (5);
   a dashboard (7);
   a device (8) according to claim 1 arranged at the dashboard (7);
   the device (8) being visible through the at least one through opening (5) of the steering wheel rim (4).

* * * * *